(12) United States Patent
Copty et al.

(10) Patent No.: US 11,295,013 B2
(45) Date of Patent: Apr. 5, 2022

(54) DIMENSIONALITY REDUCTION BASED ON FUNCTIONALITY

(71) Applicant: International Business Machines Corporation, Armonk, NY (US)

(72) Inventors: Fady Copty, Nazareth (IL); Ayman Jarrous, Shafa-amer (IL); Tamer Salman, Haifa (IL); Maksim Shudrak, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 969 days.

(21) Appl. No.: 15/837,032

(22) Filed: Dec. 11, 2017

(65) Prior Publication Data

US 2019/0180029 A1   Jun. 13, 2019

(51) Int. Cl.
    G06F 21/56     (2013.01)
    G06N 20/00     (2019.01)
    G06F 21/57     (2013.01)

(52) U.S. Cl.
    CPC ............ G06F 21/56 (2013.01); G06F 21/566 (2013.01); G06F 21/577 (2013.01); G06N 20/00 (2019.01); G06F 2221/033 (2013.01)

(58) Field of Classification Search
    CPC ....................................................... G06F 21/56
    See application file for complete search history.

(56) References Cited

U.S. PATENT DOCUMENTS

| | | | | |
|---|---|---|---|---|
| 7,032,212 B2* | 4/2006 | Amir | ................... | G06F 11/3684 714/E11.207 |
| 8,776,231 B2 | 7/2014 | Moskovitch et al. | | |
| 8,826,439 B1* | 9/2014 | Hu | ................... | G06F 21/56 726/24 |
| 9,021,589 B2* | 4/2015 | Anderson | ............. | G06F 21/566 726/23 |
| 9,386,028 B2 | 7/2016 | Altman | | |
| 9,454,658 B2 | 9/2016 | Hentunen | | |
| 9,772,925 B2* | 9/2017 | Miskelly | ................... | G06F 8/53 |
| 10,230,749 B1* | 3/2019 | Rostami-Hesarsorkh | ................... | G06F 21/552 |
| 2010/0174670 A1* | 7/2010 | Malik | ................... | G06F 16/35 706/12 |

(Continued)

OTHER PUBLICATIONS

Cho et al., "Extracting Representative API Patterns of Malware Families using Multiple Sequence Alignments", Conference on research in adaptive and convergent systems, 2015, pp. 308-313.

(Continued)

*Primary Examiner* — Fatoumata Traore
*Assistant Examiner* — Thanh H Le
(74) *Attorney, Agent, or Firm* — Ziv Glazberg

(57) ABSTRACT

An apparatus, a computer program product and a method for dimensionality reduction comprising: obtaining a set of Application Programming Interface (API) functions of a system invocable by a program, and a set of artifacts. Each artifact is associated with at least one API function and indicative of a functionality thereof. The method further comprising: clustering the API functions based on an analysis of the artifacts to create a set of clusters smaller than the set of API functions, such that each cluster comprises API functions having a similar functionality; and performing a dimensionality reduction to a feature vector using the set of clusters.

16 Claims, 4 Drawing Sheets

(56) References Cited

U.S. PATENT DOCUMENTS

| | | | |
|---|---|---|---|
| 2015/0180890 A1* | 6/2015 | Ronen | H04L 63/1416 726/23 |
| 2016/0057159 A1 | 2/2016 | Yin et al. | |
| 2017/0251003 A1* | 8/2017 | Rostami-Hesarsorkh | H04L 63/1425 |
| 2017/0269978 A1* | 9/2017 | Engel | G06F 9/541 |
| 2018/0150724 A1* | 5/2018 | Brock | G05B 13/0265 |

OTHER PUBLICATIONS

Geoff Chappell, "Windows API sets". Available at: http://www.geoffchappell.com/studies/windows/win32/apisetschema/api/index.htm?tx=2,3.

Jang et al., "BitShred: feature hashing malware for scalable triage and semantic analysis", Proceedings of the 18th ACM conference on Computer and communications security, 2011, pp. 309-320.

Dhal et al., "Large-scale malware classification using random projections and neural networks", IEEE International Conference on Acoustics, Speech and Signal Processing, 2013, pp. 3422-3426.

Ben Lulu et al., "Wise Mobile Icons Organization: Apps Taxonomy Classification Using Functionality Mining to Ease Apps Finding", 2016, Mobile Information Systems vol. 2016.

Ben Lulu et al., "Functionality-based clustering using short textual description: helping users to find apps installed on their mobile device", 2013, Proceedings of the 2013 international conference on Intelligent user interfaces, pp. 297-306.

Lin et al., "Feature Selection and Extraction for Malware Classification", Journal of Information and Science and Engineering, 2015, vol. 31, pp. 965-992.

Canzanese et al., "Run-time Classification of Malicious Processes Using System Call Analysis", 2015 10th International Conference on Malicious and Unwanted Software (MALWARE), 2015, pp. 21-28.

Salehi et al., "A miner for malware detection based on API function calls and their arguments", The 16th CSI International Symposium on Artificial Intelligence and Signal Processing, 2012, pp. 563-568.

Mora, "Feature Selection and Improving Classification Performance for Malware Detection", Thesis Presented to Department of Computer Science, Kenneasw State University, 2017.

* cited by examiner

DIMENSIONALITY REDUCTION BASED ON FUNCTIONALITY

TECHNICAL FIELD

The present disclosure relates to dimensionality reduction in general, and to dimensionality reduction for malware classification based on shared functionality, in particular.

BACKGROUND

In machine learning and statistics, dimensionality reduction is the process of reducing the number of features, e.g., random variables under consideration, by obtaining a set of principal variables. Dimensionality reduction may be divided into feature selection and feature extraction.

Feature extraction transforms the data in a high-dimensional space to a space of fewer dimensions. The data transformation may be linear, as in Principal Component Analysis (PCA), but many nonlinear dimensionality reduction techniques also exist, such as Kernel PCA, Graph-based kernel PCA, Linear Discriminant Analysis (LDA), Generalized Discriminant Analysis (GDA), or the like. Feature selection approaches try to find a subset of the original features for use in model construction.

The key difference between feature selection and extraction is that feature selection keeps a subset of the original features while feature extraction creates new features from functions of the original features. However, both feature selection and feature extraction approaches are based on statistical principles. As an example, feature selection may be performed based on variance thresholds, by removing features whose values do not change much from observation to observation (i.e. their variance falls below a threshold), as such features are considered to provide little value. Additionally or alternatively, feature selection may be performed based on correlation thresholds, by removing features that are highly correlated with others (i.e. its values change very similarly to another's), as such features are considered to provide redundant information.

BRIEF SUMMARY

One exemplary embodiment of the disclosed subject matter is a method comprising: obtaining a set of Application Programming Interface (API) functions of a system, wherein a program can invoke the API functions of the system; obtaining a set of artifacts, wherein each artifact is associated with at least one API function, wherein the each artifact is indicative of a functionality of the at least one API function; clustering the API functions based on an analysis of the artifacts, whereby creating a set of clusters smaller than the set of API functions, whereby each cluster comprises API functions having a similar functionality; and performing a dimensionality reduction to a feature vector using the set of clusters.

Another exemplary embodiment of the disclosed subject matter is a method comprising: obtaining a feature vector representing a program, wherein the feature vector comprising a plurality of features, wherein each feature of the plurality of features is associated with a usage of an Application Programming Interface (API) function of the program; determining a reduced plurality of features based on clusters of API functions, wherein the clusters are determined based on a similarity between artifacts associated with the API functions, wherein each cluster of API functions comprises API functions having a similar functionality, wherein the reduced plurality of features comprises an aggregated feature aggregating at least two features of the plurality of features, wherein the at least two features are associated with at least two API functions from a same cluster, whereby the reduced plurality of features comprises less features than the plurality of features; generating a reduced feature vector representing the program, wherein the reduced feature vector comprises the reduced plurality of features; and utilizing the reduced feature vector in a machine learning processing for identifying malware programs.

Yet another exemplary embodiment of the disclosed subject matter is a computer program product comprising a non-transitory computer readable storage medium retaining program instructions, which program instructions when read by a processor, cause the processor to perform a method comprising: obtaining a feature vector representing a program, wherein the feature vector comprising a plurality of features, wherein each feature of the plurality of features is associated with a usage of an Application Programming Interface (API) function of the program; determining a reduced plurality of features based on clusters of API functions, wherein the clusters are determined based on a similarity between artifacts associated with the API functions, wherein each cluster of API functions comprises API functions having a similar functionality, wherein the reduced plurality of features comprises an aggregated feature aggregating at least two features of the plurality of features, wherein the at least two features are associated with at least two API functions from a same cluster, whereby the reduced plurality of features comprises less features than the plurality of features; generating a reduced feature vector representing the program, wherein the reduced feature vector comprises the reduced plurality of features; and utilizing the reduced feature vector in a machine learning processing for identifying malware programs.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
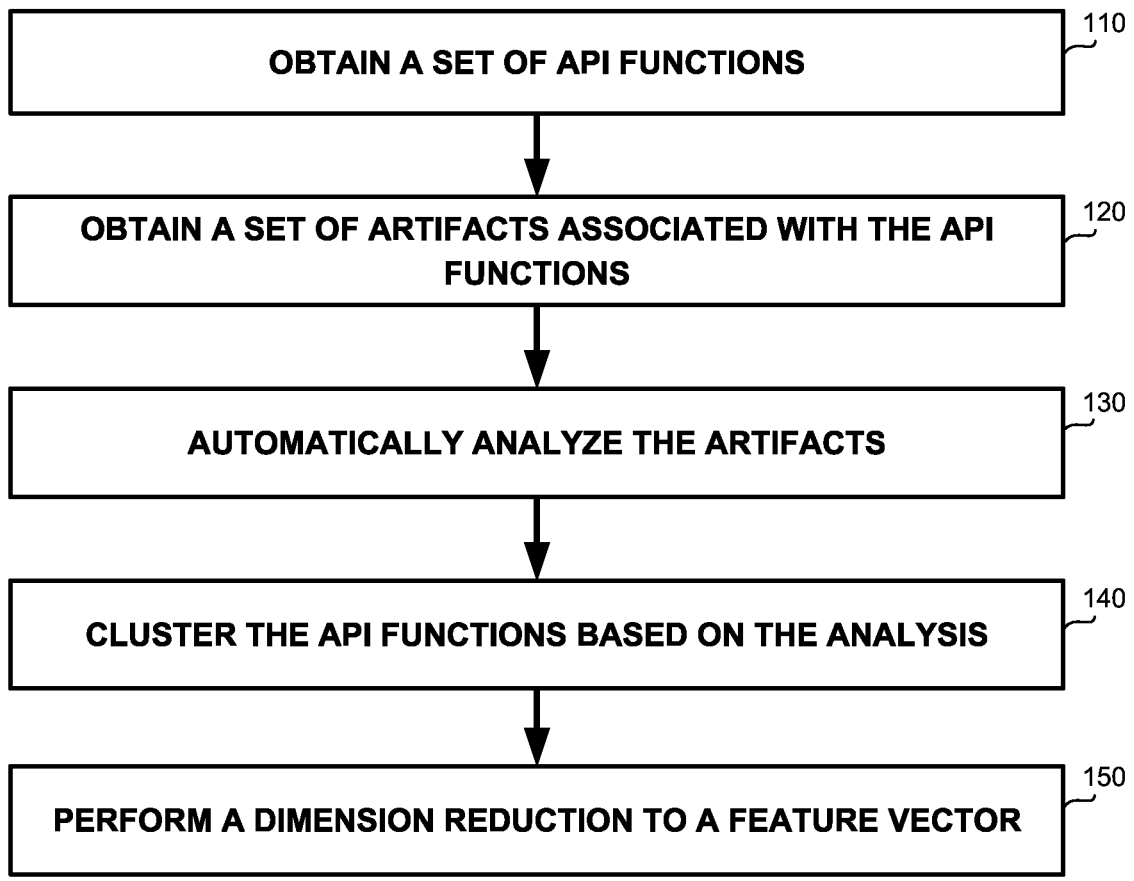
FIG. 1 shows a flowchart diagram of a method, in accordance with some exemplary embodiments of the disclosed subject matter.

One technical problem dealt with by the disclosed subject matter is to provide for an efficient dimensionality reduction for machine learning process of Malicious Software (malware) detection.

In some exemplary embodiments, malwares may be intrusive softwares, such as computer viruses, worms, Trojan horses, ransomware, spyware, adware, scareware, or other malignant programs. Malwares may be designed to damage a system, to enter the system without authorization of user of the system, or the like. A malware may take the form of executable code, scripts, active content, other software, or the like. Software such as anti-virus or firewalls may be used to protect against activity identified as malicious, and to recover from attacks. Such software may need first to detect a malware attack in order to protect the system.

In some exemplary embodiments, malware detection may be performed based on dynamic analysis, static analysis, a combination thereof, or the like of programs. The analysis may be followed by machine learning process that may produce a model for classification of programs, or identification of malwares. Static analysis may rely on features extracted without executing code, such as by analyzing binary samples, signatures, or the like. Dynamic analysis may extract features based on code execution in real time environments, code emulation, or the like. As an example, static analysis of an Android™ application may rely on features extracted from the manifest file or the Java bytecode, while dynamic analysis of Android™ applications may deal with features involving dynamic code loading and system calls that may be collected while the application is running. It may be noted that in some exemplary embodiments, static and dynamic features may be combined for detecting malware in the machine learning process.

In some exemplary embodiments, the features may be extracted based on monitored Application Programming Interface (API) functions of the system that may be invoked by programs of the system, such as system calls, functions to system libraries, hardware instructions, or the like. API functions may be configured to provide an interface between a process and the operating system. Each interface may be an event that a feature may be extracted based thereon. Additionally or alternatively, features may be extracted based on a sequence of API functions, such as a sequence of 2, 3, 4 or the like, of system calls, functions to system libraries, hardware instructions, or the like. Many modern operating systems may have hundreds of API functions, and a huge number of sequences and combinations thereof. As a result, myriad features may be produced based thereon. As an example, Linux™ and OpenBSD™ each may have over 300 different system calls, NetBSD™ may have close to 500, FreeBSD™ may have over 500 and Windows™ 7 may have approximately 700 system calls. The total number of OS-related API calls in the Windows™ OS (WinAPI) may be even larger and exceed tens of thousands. As a result, the total number of potential features to be extracted using such calls, such as count features, n-gram features, or the like, may reach millions.

The numbers of API functions that the features are extracted based on, are in a continuous increase that may lead to an unwanted increase in the number of features. When the number of features is very large relative to the number of observations in a dataset, certain algorithms, such as but not limited to, clustering algorithms, may struggle to train effective models.

In some exemplary embodiments, the number of features may be reduced based on statistical approaches, such as by feature selection, feature extraction, or the like. Reducing the features based on statistical approaches may omit features that are based on statistically rare events. In such a case, the machine learning system may be exposed to a usage of rare functions either by benign softwares or by malwares, and may cause miss-classification and miss-clustering of softwares. Additional loss of information may be caused when using statistical feature reduction, since the semantics of the API functions that the features are extracted based upon, are not being relied on. As an example, rare features that are semantically related to rare but important malware activities may be eliminated.

Additionally or alternatively, variations of malwares may be created by replacing hardware instructions, system calls, or the like, by different substitutes having an equivalent functionality. Accordingly, grouping hardware instructions, system calls, or other API functions that the feature are being extracted based on, may be required and valuable for efficient machine learning of malware detection and clustering.

It may be appreciated that a domain expert may be able to manually categorize a small number of features. As an example, for limited instruction sets, containing a limited number of instructions, it may be feasible for a domain expert to categorize the features manually, such as based on their functionality, meaning, or the like. However, such a manual categorization may not be scalable and may be infeasible in larger sets. Particularly, manually reviewing a set of hundred of thousands functions, such as in case of Microsoft™'s core set having more than 700,000 WinAPI calls, may not be feasible.

One technical solution is to generate clusters of API functions respective of the features, based on similarity measurements between artifacts associated with the API functions. A dimensionality reduction may then be performed on the features based on the clusters of the respective API functions the features have been extracted there upon.

In some exemplary embodiments, API functions of a system may be associated with artifacts that are indicative of their functionality. Such artifacts may include documentation files, subroutine definitions, protocols, or any other documents describing specifications for routines, data structures, object classes, variables, remote calls, or the like. As an example, documentations of API functions may be configured to describe what services an API function offers and how to use those services, what is the functionality of the API function, restrictions and limitations on how the API function can be used, instructions of the function, or the like. Documentation for the API functions may be publically available, such as in documentation files of the author, in social media such as blogs, forums, and Q&A websites, or the like. Traditional documentation files may be often presented via a documentation system, such as Javadoc™, Pydoc™, or the like, that has a consistent appearance and structure. However, the types of content included in the artifacts may differ from an API function to another. The documentations may include description of classes and methods in the API function as well as usage scenarios, code snippets, design rationales, performance discussions, contracts, or the like.

In some exemplary embodiments, natural language descriptions, artifacts associated with the API functions may be obtainable from publicly available resources. As an example, documentation files of each winAPI call, authored both by the manufacture (e.g. Microsoft™) or by the community, may be found in the Microsoft Developer Network (MSDN) library, along with any other official technical documentation content related thereto.

Additionally or alternatively, API functions may be disassembled to produce an artifact thereof. An artifact produced based on disassembly, may comprise a translation of an API function machine language into assembly language. In some exemplary embodiments, each API functions may be disassembled to determine which functions of the system are executed by the API functions. The assembly may be formatted for human-readability making it principally a basis to extract the functionality of the API function based thereupon.

In some exemplary embodiments, the disassembly of the API functions to produce the artifacts may be required in a case that natural language documentations of events, are lack or not publically available, or in a case that the natural language documentations are irrelevant or lack of relevant information related to the functionality of the API function, or the like.

In some exemplary embodiments, the artifact may be analyzed such as using Natural language processing (NLP) techniques. As an example, a Bag of Words (BoW) model may be used to analyze the artifacts. The BoW model may be configured to form vectors that represent the count of elements (such as words, instructions, or the like) in each artifact. The BoW model may analyzes and classify different "bags of words" (vectors). The BoW model may the match the artifacts to different categories, based on the vector representing them. As artifacts are indicative of their functionality, artifacts represented by similar vectors may be considered to have similar functionality, because of literal similarity there between. As another example, a word to vector Word2Vec model may be used to analyze the artifacts. The Word2Vec model may be configured to produces a vector space based on an artifact. The Word2Vec model may assign to each unique word in the artifact a corresponding vector in the space. Word vectors may be positioned in the vector space such that words that share common contexts in the corpus are located in close proximity to one another in the space.

Additionally or alternatively, the artifacts may be categorized based on similarity between system functions executed by the respective API functions. The analysis may be performed based on similarity between artifacts that are generated based on assemblies of API functions.

In some exemplary embodiments, the API functions may be clustered based on an analysis of the artifacts, to create a set of clusters that is smaller than the set of API functions. Each cluster of API functions may represent a specific functionality shared by API functions in the cluster.

In some exemplary embodiments, the categorization of the API functions may be generalized into categorization of n-gram sequences of API functions. An n-gram sequence of API functions may be an ordered sequence of n API functions. Such an ordered sequence of n API functions may represent a pattern of operations performed by the program. In some cases, n-gram sequences of API functions may be used to model API functions and extract features there upon. In some exemplary embodiments, the n-gram feature may be whether the sequence represented by the n-gram was encountered. Additionally or alternatively, the n-gram feature may be a count of the number of times the n-gram was encountered. An n-gram of API functions may be mapped to a respective n-gram of clusters. As an example, the n-gram of API functions may be the sequence $(AF_1, AF_2, \ldots AF_n)$. The n-gram of clusters may be the sequence $(C_1, C_2, \ldots, C_n)$, such that $AF_i$ is a member of $C_i$, where $AF_i$ is an API function appearing in the i-th location in the n-gram of API functions, and where $C_i$ is a cluster appearing in the i-th location in the n-gram of the clusters. As a result, the n-gram of clusters may aggregate several different n-gram of API functions, having a similar pattern of functionality.

In some exemplary embodiments, a dimensionality reduction may be performed to a feature vector using the clusters of API functions. Each feature in the feature vector may be extracted based on an API function. The features may be clustered according to the clusters of their respective API functions. Each cluster of features may be represented by a new feature representing the shared functionality between the respective API functions. Additionally or alternatively, a feature aggregating features associated with API functions belonging to the same cluster may be generated. As the number of clusters is lower than the number of features, the reduced feature vector may comprise less features than original feature vector.

In some exemplary embodiments, the reduced feature vector may be utilized in a machine learning processing for identifying malware programs. The feature vector may be used for classification of programs as malware or unmaliciously, such as in nearest neighbor classification, neural networks, Bayesian approaches, or the like. In some exemplary embodiments, the classification using the feature vector may be performed by calculating a scalar product between the feature vector and a vector of weights; comparing the result with a threshold; and deciding the class based on the comparison.

One technical effect of utilizing the disclosed subject matter is to reduce the time and storage space required for machine learning, without affecting the effectiveness of the classification. In order to achieve an effective classification, the feature vector is required to comprise informative, discriminating and independent features. The disclosed subject matter automatically reduces the feature number based on the semantic of the features, while keeping all of the information represented by the features, even the rarest. Accordingly, features in the reduced feature vector may cover all of the functionalities and types of API functions.

Another technical effect of utilizing the disclosed subject matter is overcoming the malware variation problem. In the disclosed subject matter, features are clustered based on similarity of the functionality of their respective API functions. Programs may be classified based on features representing the functionality and not only the syntax. As a result, variations of malwares that are created by replacing portions or elements thereof with different substitutes having an equivalent functionality; may be still classified as malicious.

The disclosed subject matter may provide for one or more technical improvements over any pre-existing technique and any technique that has previously become routine or conventional in the art.

Additional technical problem, solution and effects may be apparent to a person of ordinary skill in the art in view of the present disclosure.

Referring now to FIG. 1 showing a flowchart diagram of a method, in accordance with some exemplary embodiments of the subject matter.

On Step 110, a set of API functions may be obtained. In some exemplary embodiments, the set of API functions may comprise API function of a system. Programs of the system may be configured to invoke the API function, in order to exchange information with the system, request for processing, return of necessary data, or the like.

As an example, the set of API functions may be the x86 instruction set. The x86 instruction set refers to the set of instructions that x86-compatible microprocessors support. The x86 instructions may be part of an executable program, often stored as a computer file and executed on the processor. Other examples of API function sets may include Android API, ARM instructions, or the like.

On Step 120, a set of artifacts associated with the API functions may be obtained. Each artifact may be associated with at least one API function of the set of API functions. Each artifact may be indicative of a functionality of the API functionality associated there with.

In some exemplary embodiments, an artifact may be a documentation of an API function. The API documentation may be a technical content deliverable, containing instructions about how to effectively use and integrate with an API function. The API documentation may comprise information required to work with the API function, details about the functions, classes, return types, arguments, or the like.

Additionally or alternatively, an artifact of an API function may be a disassembly of the API function. Each disassembly may be produced by disassembling an API function. Each disassembly may comprise instructions performed by the API function, formatted for human-readability, based the binary code of the API function.

On Step 130, the artifacts may be automatically analyzed. In some exemplary embodiments, the artifacts may be provided in natural language, such as programming language, assembly language, human-readable language, or the like. The artifacts may be analyzed using natural language analysis. As an example, shared words between different artifacts may be identified, counts of each word in each artifact may be determined, key words search may be performed, or the like.

On Step 140, the API functions may be clustered based on the analysis. In some exemplary embodiments, a set of clusters that is smaller than the set of API functions may be created. Each cluster may comprise API functions having a similar functionality. As an example, artifacts sharing the same words may be grouped together into the same cluster. Such a literal similarity between the artifacts may point to a functional similarity between the corresponding API functions.

On Step 150, a dimensionality reduction may be performed on a feature vector. In some exemplary embodiments, the dimensionality reduction of the feature vector may be performed on the set of clusters. The feature vector may correspond to the set of API functions, such that each feature in the vector may be derived based on an API function of the set. The dimensionality reduction may map to every cluster a feature representing the shared functionality of the API functions grouped in the cluster.

Figure 2:
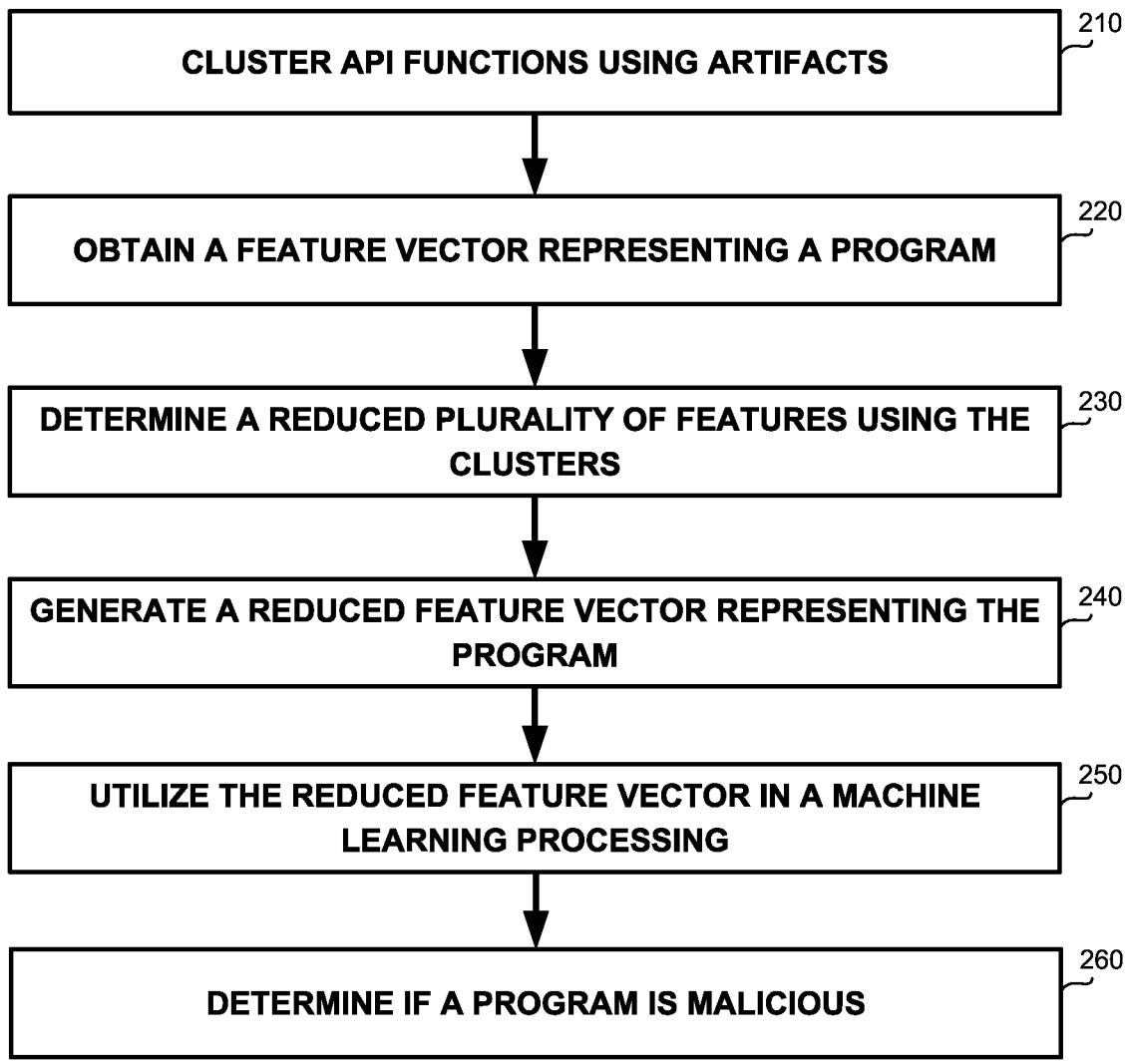
FIG. 2 shows a flowchart diagram of a method, in accordance with some exemplary embodiments of the disclosed subject matter.

Referring now to FIG. 2 showing a flowchart diagram of a method, in accordance with some exemplary embodiments of the subject matter.

On Step 210, API functions may be clustered using artifacts. In some exemplary embodiments, the API functions may be clustered such as described in Step 140 of FIG. 1. The clusters may be determined based on a similarity between artifacts associated with the API functions. Each cluster of API functions may comprise API functions having a similar functionality.

On Step 220, a feature vector representing a program may be obtained. In some exemplary embodiments, the feature vector may comprise a plurality of features. Each feature of the plurality of features may be associated with a usage of an API function of the program.

On Step 230, a reduced plurality of feature may be determined based on the clusters of API functions. In some exemplary embodiments, the reduced plurality of features may comprise an aggregated feature aggregating at least two features of the plurality of features. The at least two features may be associated with at least two API functions from a same cluster. The reduced plurality of features may comprise fewer features than the plurality of features.

On Step 240, a reduced feature vector representing the program may be generated. In some exemplary embodiments, the reduced feature vector may comprise the reduced plurality of features.

On Step 250, the reduced feature vector may be utilized in a machine learning processing for identifying malware programs.

In some exemplary embodiments, the reduced feature vector may be combined with weights. The weights may be used to construct a linear predictor function that is used to determine a score for making a prediction. The feature vector may be utilized for training a classifier that predicts whether a program is malicious or not based on the weights of the reduced feature corresponding thereto.

On Step 260, a determination whether a program is malicious may be performed. In some exemplary embodiments, the program may be classified based on the score obtained from the weights of the reduced feature vector.

Figure 3:
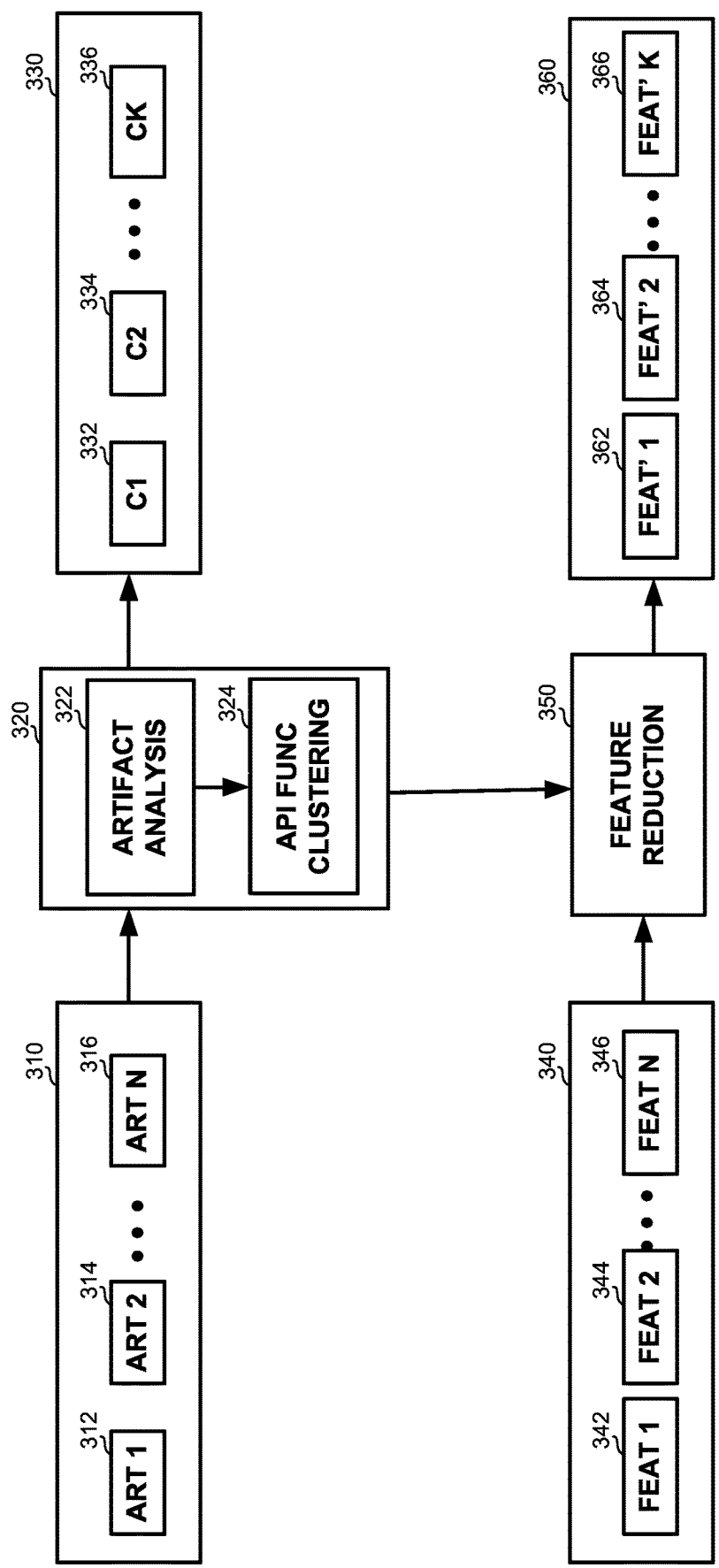
FIG. 3 shows a schematic illustration of an exemplary architecture, in accordance with some exemplary embodiments of the disclosed subject matter.

Referring now to FIG. 3 showing a schematic illustration of an exemplary architecture, in accordance with some exemplary embodiments of the disclosed subject matter.

In some exemplary embodiments, a Feature Vector 340 may represent a program. Feature Vector 340 may be an n-dimensional vector of numerical features that represent the program. Feature Vector 340 may be configured to be utilized in machine learning. Feature Vector 340 may comprise a plurality of n features, e.g., Feature_1 342 to Feature_n 346. Each feature may be associated with a usage of an API function of the program. In some exemplary embodiments, the API functions may be functions of a system that can be invoked by a program executed by the system, such as a system call, a function to a system library, a hardware instruction, or the like. In some exemplary embodiments, Feature Vector 340 may be obtained in a feature construction process. In some exemplary embodiments, each feature may represent a numerical representation of an API function, such as the frequencies of occurrence of textual terms in the API function, range of values of parameters of the API function, or the like. The numerical representations may facilitate processing and statistical analysis.

As an example, each feature may be a count of the calls of the respective API function, n-gram sequence count of API functions, such as 2-gram sequence count (e.g., count of sequence of 2 API functions), 3-gram sequence count (e.g., count of sequence of 3 API functions), or the like.

As an example, the API functions may be Microsoft's core set APIs available in the Microsoft Windows operating systems, i.e., winAPI. Windows programs may be configured to interact with the system using the winAPIs. As an example, winAPI functions may be configured to provide base services to the program, such as providing access to the basic resources available to a Windows system, including file systems, devices, processes, threads, error handling, or the like. As another example, winAPI functions may be configured to provide advanced services to the programs, such as providing access to functions beyond the kernel, such as the Windows registry, shutdown/restart the system, start/stop/create a Windows service, manage user accounts, or the like. Additional examples of the usage of winAPIs may be provided, such as outputting graphics content to monitors, printers, and other output devices, creating and managing screen windows and other basic controls, performing functions associated with the graphical user interface (GUI) part of Windows, opening and saving files, giving access to the various networking abilities of the operating system, or the like. Feature Vector 340 in this example, may be a vector of winAPI calls count, 2-gram and 3-gram sequences count of those winAPI calls.

In some exemplary embodiments, a Set of Artifacts 310 associated with Feature Vector 340 may be obtained. Set of Artifacts 310 may comprise a plurality of artifacts, such as Artifact 1 312 to Artifact n 316. Each artifact may be associated with at least one API function, and may be indicative of the functionality of the at least one API function.

In some exemplary embodiments, each artifact may be a documentation file of an API function. A Prediction Component 320 may be configured to extract the documentation file of each API function associated with a feature from Feature Vector 340. Such documentations files may be publically available. Referring to the winAPI example, documentations of the winAPI functions may be obtainable from MSDN.

Additionally or alternatively, the artifact may be a disassembly of an API function. The disassembly may be produced by the API function associated with the respective feature.

In some exemplary embodiments, Prediction Component 320 may be configured to generate a Set of Clusters 330 of API functions based on Set of Artifacts 310. Each cluster of Set of Clusters 330 may comprise API functions having a similar functionality. Set of Clusters 330 may be determined based on a similarity between artifacts from Set of Artifacts 310 associated with the API functions.

In some exemplary embodiments, an Artifact Analysis Component 322 may be configured to analyze the artifacts in Set of Artifacts 310. Artifact Analysis Component 322 may be configured to perform natural language analysis on the artifacts, in order to determine similarity therebetween. Artifact Analysis Component 322 may be configured to perform an analysis on the artifacts that enables Prediction Component 320 to determine a shared functionality between the API functions associated with the artifacts.

As an example, Artifact Analysis Component 322 may convert each artifact into a vector of numbers using a BoW technique. Each number in each vector represents a count of a word in the respective artifact.

In some exemplary embodiments, API Functions Clustering Component 324 may be configured to cluster the API functions based on an analysis of the artifacts. API Functions Clustering Component 324 may be configured to creating a Set of Clusters 330 smaller than the set of API functions (or Set of Artifacts 310). Each cluster may comprise API functions having a similar functionality.

Referring again to the winAPI example, API Functions Clustering Component 324 may group winAPI having similar vectors representing their artifacts into the same cluster. Prediction Component 320 may project each winAPI function to a cluster by summing all winAPI counts that project to the same cluster. Similarly, each n-gram of winAPI functions may be projected to a respective n-gram of clusters.

In some exemplary embodiments, Feature Reduction Component 350 may be configured to perform a dimensionality reduction to Feature Vector 340 using Set of Clusters 330. Feature Reduction Component 350 may be configured to determine a reduced plurality of k features based on the k clusters of API functions, e.g., Cluster_1 332 to Cluster_k 336. The reduced plurality of features may comprise less features than the plurality of features, e.g., k<n. The reduced plurality of features may comprise aggregated features aggregating two or more features of the plurality of features that are associated with API functions from a same cluster.

As an example, the API functions associated with Artifact_1 312 and Artifact_2 314 may be grouped into Cluster_2 334, and accordingly, Feature'_2 364 may aggregate Feature_1 342 and Feature_2 344.

Feature Reduction Component 350 may be configured to generate a Reduced Feature Vector 360 representing the program. Reduced Feature Vector 360 may comprise the reduced plurality of features, e.g., Feature'_1 362 to Feature'_k 366.

Reduced Feature Vector 360 may be utilized in a machine learning processing for identifying malware programs.

Figure 4:
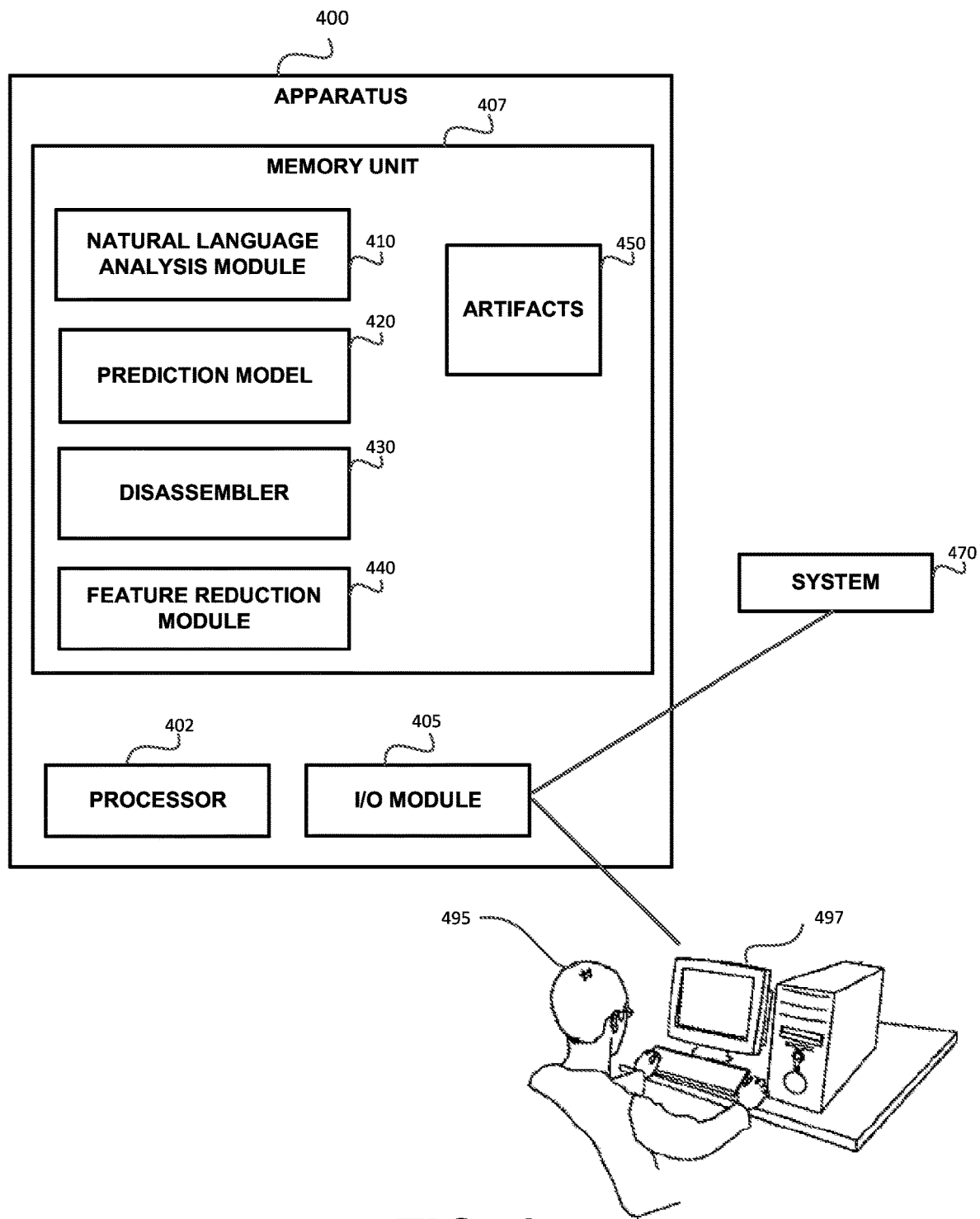
FIG. 4 shows a block diagram of an apparatus, in accordance with some exemplary embodiments of the disclosed subject matter.

Referring now to FIG. 4 showing an apparatus in accordance with some exemplary embodiments of the disclosed subject matter.

An Apparatus 400 may be configured to support parallel user interaction with a real world physical system and a digital representation thereof, in accordance with the disclosed subject matter.

In some exemplary embodiments, Apparatus 400 may comprise one or more Processor(s) 402. Processor 402 may be a Central Processing Unit (CPU), a microprocessor, an electronic circuit, an Integrated Circuit (IC) or the like. Processor 402 may be utilized to perform computations required by Apparatus 400 or any of it subcomponents.

In some exemplary embodiments of the disclosed subject matter, Apparatus 400 may comprise an Input/Output (I/O) module 405. I/O Module 405 may be utilized to provide an output to and receive input from a user, such as, for example I/O Module 405 may be utilized to obtain functions of a system to be analyzed by Apparatus 400, such as API functions of System 470, or the like. As other examples, I/O Module 405 may be utilized to obtain feature vectors associated with a system, provide reduced feature vectors to systems, or the like.

In some exemplary embodiments, Apparatus 400 may comprise Memory 407. Memory 407 may be a hard disk drive, a Flash disk, a Random Access Memory (RAM), a memory chip, or the like. In some exemplary embodiments, Memory 407 may retain program code operative to cause Processor 402 to perform acts associated with any of the subcomponents of Apparatus 200. In some exemplary embodiments, Memory 407 may retain Artifacts 450. Each artifact may be associated with one or more API function. Each artifact may be indicative of a functionality of the API function associated thereto.

Natural Language Analysis Module 410 may be configured to obtain a set of API functions of a system, such as System 470. The set of API functions may be provided to Natural Language Analysis Module 410 by I/O Module 450. The API functions of the system may be invocable by a program executed by System 470. The API functions may comprise system calls, function to a system library, hardware instructions, or the like.

Natural Language Analysis Module 410 may be configured to analyze artifacts that are associated with the set of API functions. The artifacts may comprise documentation files of the API functions, disassembles of the API functions, or the like. Natural Language Analysis Module 410 may be configured to perform natural language analysis on the artifacts.

In some exemplary embodiments, the artifacts may be stored in Memory 407, such as Artifacts 450. Additionally or alternatively, the artifacts may be provided by I/O Module 450. Additionally or alternatively, the artifacts may be generated by a Disassembler 430. Disassembler 430 may be configured to disassemble API functions to produce an artifact of an API function.

Prediction Module 420 may be configured to generate a set of clusters of the API functions based on similarity measurements between the artifacts associated with the API functions. The set of clusters may be smaller than the set of API functions. Each cluster in the set of clusters may comprise API functions having a similar functionality.

Prediction Module 420 may be configured to determine similarity measurements between the artifacts based on the analysis of the artifacts performed by Natural Language Analysis Module 410.

Feature Reduction Module 440 may be configured to perform dimensionality reduction to a feature vector using the set of clusters generated by Prediction Module 420. The feature vector may be configured to represent a program executed by System 470. The feature vector may a plurality of features, each of associated with a usage of an API function of the program.

In some exemplary embodiments, Feature Reduction Module 440 may be configured to determine a reduced plurality of features based on clusters of API functions. The reduced plurality of features may comprise an aggregated feature aggregating at least two features of the plurality of features. The at least two features may be associated with at least two API functions from a same cluster. It may be appreciated that the reduced plurality of features may comprise fewer features than the plurality of features.

In some exemplary embodiments, Feature Reduction Module 440 may be configured to generate a reduced feature vector representing the program. The reduced feature vector may comprise the reduced plurality of features.

In some exemplary embodiments, the reduced feature vector may be provided to System 470. The reduced feature vector may be utilized in a machine learning processing for identifying malware programs for System 470.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    obtaining a set of Application Programming Interface (API) functions of a system, wherein the set of API functions comprises at least two different API functions having at least two different functionalities, wherein a program can invoke the API functions of the system;
    obtaining a set of artifacts, wherein each artifact is associated with at least one API function, wherein the each artifact is indicative of a functionality of the at least one API function;
    clustering the API functions based on an analysis of the artifacts, whereby creating a set of clusters smaller than the set of API functions, whereby each cluster comprises API functions having a similar functionality;
    performing a dimensionality reduction to a feature vector representing the program using the set of clusters, whereby a reduced feature vector representing the program is generated based on the dimensionality reduction of the feature vector, wherein the reduced feature vector comprises less features than the feature vector.

2. The method of claim 1, wherein each API function provides an interface between a process and the system, whereby a feature of the program is extracted based on the interface, and wherein each API function is selected from the group consisting of: a system call, a function to a system library, and a hardware instruction.

3. The method of claim 1, wherein each artifact is selected from the group consisting of: a documentation file of the at least one API function and a disassembly of the at least one API function, wherein the documentation file of the at least one API function comprises a natural language description of aspects of the API function, and wherein the disassembly of the at least one API function comprises a translation of the at least one API function into assembly language.

4. The method of claim 1, wherein said obtaining the set of artifacts comprises disassembling of an API function to produce an artifact of the API function.

5. The method of claim 1, wherein said clustering the API functions is performed based on a natural language analysis of the set of artifacts.

6. A method comprising:
    obtaining a feature vector representing a program, wherein the feature vector comprising a plurality of features, wherein each feature of the plurality of features is associated with a usage of an Application Programming Interface (API) function of the program;
    determining a reduced plurality of features based on clusters of API functions, wherein the clusters are determined based on a similarity between artifacts associated with the API functions, wherein each cluster of API functions comprises API functions having a similar functionality, wherein the reduced plurality of features comprises an aggregated feature aggregating at least two features of the plurality of features, wherein the at least two features are associated with at least two API functions from a same cluster, wherein the least two API functions have equivalent functionalities, whereby the reduced plurality of features comprises less features than the plurality of features;
    generating a reduced feature vector representing the program, wherein the reduced feature vector comprises the reduced plurality of features; and
    utilizing the reduced feature vector in a machine learning processing for identifying malware programs.

7. The method of claim 6, wherein each API function provides an interface between a process and the system, whereby a feature of the program is extracted based on the interface, and wherein each API function is selected from the group consisting of: a system call, a function to a system library, and a hardware instruction.

8. The method of claim 6, wherein each artifact is selected from the group consisting of: a documentation file of the at least one API function and a disassembly of the at least one API function, wherein the documentation file of the at least one API function comprises a natural language description of aspects of the API function, and wherein the disassembly of the at least one API function comprise a translation of the at least one API function into assembly language.

9. The method of claim 6, further comprising:
generating the clusters of the API functions based on similarity measurements between the artifacts associated with the API functions, whereby each cluster comprises API functions having a similar functionality.

10. A computer program product comprising a non-transitory computer readable storage medium retaining program instructions, which program instructions when read by a processor, cause the processor to perform a method comprising:
obtaining a feature vector representing a program, wherein the feature vector comprising a plurality of features, wherein each feature of the plurality of features is associated with a usage of an Application Programming Interface (API) function of the program;
determining a reduced plurality of features based on clusters of API functions, wherein the clusters are determined based on a similarity between artifacts associated with the API functions, wherein each cluster of API functions comprises API functions having a similar functionality, wherein the reduced plurality of features comprises an aggregated feature aggregating at least two features of the plurality of features, wherein the at least two features are associated with at least two API functions from a same cluster, wherein the least two API functions have equivalent functionalities, whereby the reduced plurality of features comprises less features than the plurality of features;
generating a reduced feature vector representing the program, wherein the reduced feature vector comprises the reduced plurality of features; and
utilizing the reduced feature vector in a machine learning processing for identifying malware programs.

11. The computer program product of claim 10, wherein each API function provides an interface between a process and the system, whereby a feature of the program is extracted based on the interface, and wherein each API function is selected from the group consisting of: a system call, a function to a system library, and a hardware instruction.

12. The computer program product of claim 10, wherein each artifact is selected from the group consisting of: a documentation file of the at least one API function and a disassembly of the at least one API function, wherein the documentation file of the at least one API function comprises a natural language description of aspects of the API function, and wherein the disassembly of the at least one API function comprises translation of the at least one API function into assembly language.

13. The computer program product of claim 10, wherein said method further comprising:
generating the clusters of the API functions based on similarity measurements between the artifacts associated with the API functions, whereby each cluster comprises API functions having a similar functionality.

14. The computer program product of claim 10, wherein said method further comprising:
disassembling of an API function to produce an artifact of the API function.

15. The computer program product of claim 10, wherein said method further comprising:
performing natural language analysis on the set of artifacts to determine the similarity between the artifacts.

16. An apparatus comprising said processor and a memory, wherein said memory retaining the computer program product of claim 10.

* * * * *